Patented Apr. 9, 1940

2,196,448

UNITED STATES PATENT OFFICE 2,196,448

INSECTICIDAL COMPOSITION

William Hunter Volck, Watsonville, Calif., assignor to California Spray-Chemical Corporation, Berkeley, Calif., a corporation of Delaware No Drawing. Application January 14, 1938,
Serial No. 185,012

6 Claims. (Cl. 167—16)

This invention pertains to insecticidal compositions in which the major toxic component is an inorganic fluoride and more particularly to such compositions in which the fluoride is one having relatively low solubility in water.

The toxicity of fluorine compounds and particularly the more water-soluble inorganic fluorides to most forms of insect life has long been recognized. Unfortunately, however, many of the inorganic fluorides are also extremely toxic to most plants. In order to reduce, as far as possible, damage to vegetation the inorganic fluorides and double fluorides, having low solubility in water, have come into more general use. Typical among these may be mentioned barium fluosilicate, magnesium fluoride, cryolite, and fluorspar. While through the use of these compounds the toxicity to vegetation may be largely avoided, it has been found that the toxicity to insects is also quite low and in many cases so low that their value as insecticides is open to some question. While with chewing insects that consume considerable quantities of the surface of leaves and fruit this question is not serious, with other insects that ingest only small quantities of surface material the quantity of fluoride taken may be insufficient to provide adequate control.

It is accordingly the broad object of this invention to provide insecticidal inorganic fluorine containing compositions which are relatively harmless to growing vegetation but which, at the same time, are possessed of high insecticidal efficiency.

A further object of the invention is to provide insecticidal compositions in which the relatively water insoluble fluorides are rendered more efficacious through the presence of other components which are not, in themselves, insecticides.

Still another object of the invention is to provide insecticidal fluoride compositions carrying components which co-act with the fluoride to produce an increased toxic effect on the insects without resulting in increased toxicity to vegetation.

Still a further object of the invention is to provide insecticidal compositions in which the toxicity of water-insoluble fluorides to insects is enhanced by materials having other functions desirable in insecticidal sprays and dusts.

Still other objects of the invention will be apparent to those skilled in the art from the following discussion and examples.

This invention is based on the following two discoveries:

First, that the deficiency in insecticidal efficacy of the relatively insoluble fluorides may be compensated for by causing an insect to consume materially increased quantities of the fluoride and Second, that such increased consumption can be brought about by applying, with the fluoride, one or more agents which appear to serve as powerful irritants to the insect. Under the influence of a contact irritant, an insect will display unusual activity in attempting to free itself of any preparation which has been deposited on it or with which it may have become coated in traversing the treated surfaces of vegetation. During such cleansing activity, far greater quantities of the deposit will find its way into the digestive tract of the insect than would be digested during normal feeding.

One class of compounds, which have been found to constitute powerful irritants for most insects, contain the element copper. Of this class, those materials which are already well known for their fungicidal value are well suited to the present use. They are, in general, the more water-insoluble copper compounds and those which are substantially neutral in reaction and are thus among the least harmful to growing vegetation. Such compounds as copper silicate, copper basic silicate, the copper-ammonium silicate of Patent No. 1,988,752, the copper-calcium silicate of Patent No. 2,083,098, the copper-zinc and copper-calcium-zinc silicates of Patent No. 2,051,910, the corresponding hydroxy or "basic" silicates, copper carbonate, copper basic sulfate, etc. fall in this class. Distinctly alkaline compounds such as the widely used "Bordeaux Mixture", which always contains a large excess of lime, have been found to be incompatible with most fluorides, apparently due to some complex interaction, and are therefore useless in the present connection.

The quantity of copper compound which has been found necessary to produce the desired irritant effect does not appear to be particularly critical though it may be expected to vary somewhat with the solubility and physical form of the individual substance employed. In general, I have found that a dosage which would ordinarily be applied alone as a fungicide will be amply sufficient for the irritant effect which I desire. In many instances lesser quantities will be found adequate.

A second group of materials which have been found to exert a quite similar irritant effect on insects, when applied with the relatively insoluble fluorides, comprises the sulfonated and sulfated higher alcohols, fatty acids, and the well known petroleum sulfonates. Such compounds have recently received considerable attention as emulsifying and wetting agents, detergents, spreaders, etc. in numerous branches of industry. Sulfated or sulfonated octyl, lauryl and higher alcohols, the sulfated unsaturated fatty acids containing from about 12 to 18 carbon atoms, the sulfonated saturated fatty acids in the same range and the sulfonates from petroleum, such as those described in U. S. Patents 1,087,888, 1,286,179, 1,867,778, 1,922,607, and 1,955,859, and the alkali metal salts of any of them may be taken as typical of this group. While one such compound may be slightly better than another in certain minor respects, the major requirement for the present use appears to be merely a sulfated and/or sulfonated organic molecule containing from about eight to eighteen or more carbon atoms and having a considerable tendency to the lower the surface tension of water. While I prefer to use the petroleum sulfonates because of their ready availability, their low cost, the fact that their action on vegetation, under the widest possible conditions, is already known, and the fact that when dry they produce a solid that can readily be ground in the preparation of compositions for application in dust form, it is to be understood that my invention is not limited thereto.

So far as I am yet aware, no particular preference can be given to either the copper group or the sulfonate-sulfate group in regard to their action as irritants for use in enhancing the insecticidal efficiency of insoluble fluorides. Since each group is characterized by a function in addition to insect irritation, which may be desirable in an insecticidal preparation, the former as a fungicide and the latter as a wetting agent, spreader and/or sticker, it may be desirable to employ either or both, depending on the particular conditions of use contemplated, such as the season of the year, the nature of the crop to be treated, the type of insect, the presence of fungal infestation, etc.

The augmentation of insecticidal effect by copper compounds and by the sulfonate-sulfate materials, which has just been described, appears to be quite comparable on all of the inorganic fluorine compounds of low solubility in water. Such fluorides are, however, not all equal in their action on vegetation, some being decidedly more harmful than others. Neither is any one of them equally harmful to all species of vegetation or equally toxic to all forms of insect life. The preferred fluoride for use in any particular combination will therefore depend largely on the specific service contemplated. For most uses I have found cryolite, which has the advantage of being relatively cheap and widely available, to be entirely satisfactory.

After testing many different combinations under a wide variety of circumstances, I have found that cryolite in combination with copper-calcium silicate (Patent No. 2,083,098) and a preferentially water-soluble petroleum sulfonate (Patent No. 1,922,607) is probably best suited to the widest range of conditions. In one preferred example I use these components in the following proportions:

| | Per cent |
|---|---|
| Cryolite (synthetic or natural) | 46.2 |
| Copper-calcium silicate complex | 33.3 |
| Petroleum sulfonate | 7.7 |
| Fuller's earth | 12.8 |

These components may be dried and ground together in a ball mill or equivalent apparatus or the petroleum sulfonates may be absorbed on the fuller's earth before drying and then dried and ground with the other components.

A second composition which I have found satisfactory under most conditions is as follows:

| | Per cent |
|---|---|
| Barium fluosilicate | 40 |
| Copper complex silicate | 40 |
| Sulfated alcohol and inert support | 20 |

While the foregoing and equivalent compositions have been tested and found effective against many forms of leaf or surface feeding insects, such as corn earworm, cherry-pear or rose slugs, flea beetles, weevils or snout beetles, they were found particularly effective against the twelve spotted cucumber beetle, *Diabrotica duodecimpunctata* (Fabr.), a pest which is exceedingly difficult to control by hitherto known means. Striped beetles and Argentine ants have also been found to be particularly susceptible to these preparations.

The compositions of this invention are susceptible of application either as dusts or as suspensions in water, those containing the sulfonate-sulfate type of irritant-stimulant being particularly suited to the latter form of application because of the general tendency of such materials to possess appreciable wetting and spreading power. For wet application a satisfactory spray would contain about 5 lbs. of the solid mixture per 100 gallons though more or less may be employed if desired.

While I have named several specific fluorides and double fluorides that are sufficiently insoluble in water to be relatively harmless to most vegetation and are at the same time sufficiently weak in their insecticidal activity to benefit materially by the augmenting effect which I have discovered and have hereinabove described, and while I have named several specific insect irritant-stimulants selected from the substantially neutral and water-insoluble copper fungicides and the polar water-soluble sulfated and/or sulfonated organic surface tension reducing agents, it will be apparent to one skilled in the art that my invention comprehends the combination of water-insoluble fluorides broadly with insect irritants or stimulants which act to cause increased ingestion of the fluoride by the insects and preferably such irritant-stimulants as additionally contribute fungicidal and/or wetting, spreading and sticking characteristics to the composition as a whole.

Having now fully described and illustrated my invention, I claim:

1. An insecticidal composition comprising cryolite, a copper silicate complex and a petroleum sulfonate.

2. An insecticidal composition comprising the following constituents in approximately the following proportions:

| | Per cent |
|---|---|
| Cryolite | 46.2 |
| Copper silicate complex | 33.3 |
| Petroleum sulfonate | 7.7 |
| Fuller's earth | 12.8 |

3. An insecticidal composition comprising cryolite, a copper silicate complex, a petroleum sulfonate and an inert filler.

4. An insecticidal composition comprising cryolite and a copper silicate complex.

5. An insecticidal composition comprising a water insoluble inorganic fluorine compound and a copper-zinc silicate complex.

6. An insecticidal composition comprising barium fluosilicate, a copper silicate complex, a sulfated higher alcohol and an inert support.

WILLIAM HUNTER VOLCK.

CERTIFICATE OF CORRECTION.

Patent No. 2,196,448.            April 9, 1940.

WILLIAM HUNTER VOLCK.

It is hereby certified that error appears in the printed specification of the above numbered patent requiring correction as follows: Page 1, second column, line 12, for the word "digested" read ingested; and that the said Letters Patent should be read with this correction therein that the same may conform to the record of the case in the Patent Office.

Signed and sealed this 18th day of June, A. D. 1940.

(Seal)                                          Henry Van Arsdale,
Acting Commissioner of Patents.